June 26, 1956 — R. P. CAHN — 2,752,407
SHORT-TIME REACTIONS OF GASES AT ELEVATED TEMPERATURES
Filed Sept. 17, 1951
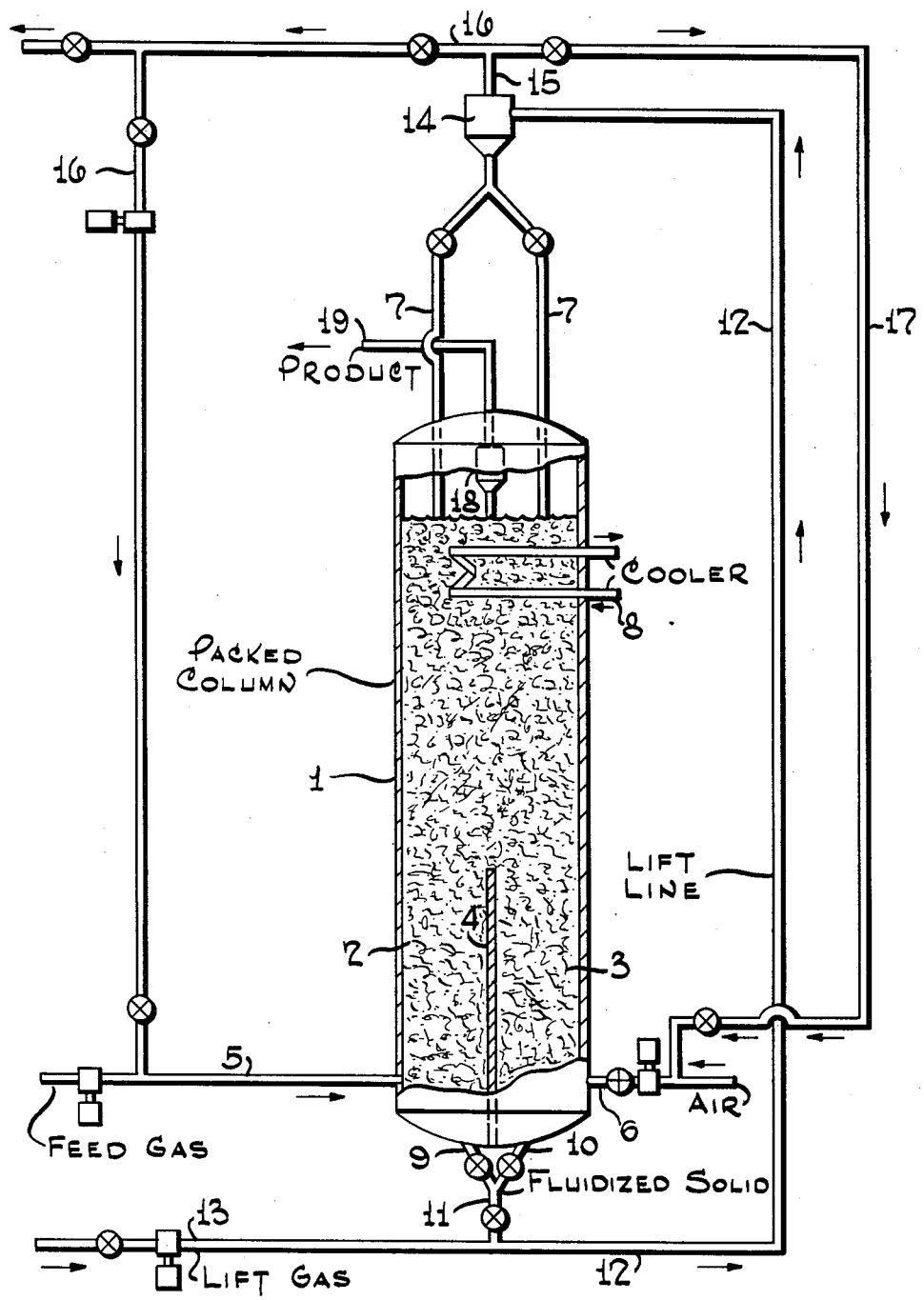
Robert P. Cahn Inventor
By Peter H. Smoka Attorney

United States Patent Office 2,752,407
Patented June 26, 1956

2,752,407

SHORT-TIME REACTIONS OF GASES AT ELEVATED TEMPERATURES

Robert P. Cahn, Elizabeth, N. J., assignor to Esso Research and Engineering Company, a corporation of Delaware Application September 17, 1951, Serial No. 246,973

6 Claims. (Cl. 260—683)

This invention relates to a method and apparatus for conducting reactions at very high temperatures, such as autothermic cracking of ethane, in such a manner that only relatively cool streams need to be fed to and withdrawn from the reaction vessel. More particularly, a characteristic of the preferred embodiment of the present invention is the carrying out of heat exchange between reactant and product by means of a finely divided fluidized powder which is circulated through a packed bed or a bubble-cap tower containing a gas heating zone at the bottom, a high temperature reaction zone in an intermediate portion of the tower, and a quenching or cooling zone above the reaction zone. Preferably two or more different gases or vapors are introduced separately at a low temperature at the bottom of the conversion vessel and sequentially heated, reacted and cooled on upward passage therethrough while a relatively cool, finely divided solid heat exchange material or catalyst is introduced at the top and passed downwardly through the vessel in countercurrent heat exchange with the rising gases and is recirculated to the top by means of a lift gas.

The contacting of essentially countercurrent streams of gases and finely divided solids in packed towers or similar vessels has been known and practiced heretofore, since such processes afford numerous advantages such as intimate contact, selective removal of the most completely converted or spent reactants, rapid and efficient heat transfer and uniformity of temperature in any given zone. However, due to the high heat capacity or thermal inertia of such processes, their adaptation to reactions requiring very short reaction times has usually resulted in an excessive amount of undesirable after-reactions which reduced the yields of the desired product. This has been particularly true with endothermic reactions for converting hydrocarbons wherein heat has heretofore usually been supplied to the reaction zone by means of a circulating finely divided solid which picked up sensible heat in an external heating zone for transfer to the reactants in the reaction zone. Also, this method of heat transfer has necessarily resulted in considerable loss of heat level, since hot solids were being transferred at the required high temperatures from the heating or regeneration zone to the conversion zone maintained at a lower temperature, and consequently an inefficient heat utilization resulted.

On the other hand, where high temperature reactions of gases were carried out in the absence of fluidized solids, uniformity of temperature has been most difficult to obtain and fuel utilization has been most inefficient, since indirect rather than direct heat exchange usually had to be relied upon. Also, when high temperatures were required for the desired reaction, indirect heat exchange involved the use of very expensive alloy steel heat exchange equipment.

It is among the principal objects of this invention to improve the chemical and thermal efficiencies of vapor phase reactions at high temperatures, and to provide a convenient apparatus for performing such reactions under controlled conditions. Other objects of the invention as well as its eventual scope will become apparent from the subsequent description and appended claims.

A diagrammatic view of an apparatus adapted to carry out autothermic cracking of ethane as a specific embodiment of the invention is shown in the attached drawing and is described in detail hereafter. However, it will be understood that this is being done principally for purposes of illustration rather than limitation, since the essential principles of the invention can be applied similarly to other high temperature reactions. Accordingly numerous variations and modifications not specifically mentioned herein are possible within the spirit and scope of the present invention.

Referring to the drawing, the reference character 1 designates a reactor or conversion vessel wherein ethane is cracked to ethylene at temperatures between about 1500 and 2000° F., and at pressures between about 0 and 50 pounds per square inch gauge, preferably at about 25 pounds per square inch gauge. The reactor preferably is a packed tower 1 whose lower portion may be divided into two compartments 2 and 3 by means of a vertical baffle 4 which may extend through about the lowest third or quarter of the tower.

The tower is substantially filled with relatively coarse and stationary packing elements spaced to provide an interconnecting labyrinth of continuous passages in which the rising gaseous reactants are in countercurrent contact with finely divided solids which are maintained in a fluidized, liquid simulating state. These packing elements prevent the overall swirling of the solids throughout the full length and breadth of the treating zone and also tend to break up and disperse the larger gas bubbles which tend to form. Furthermore, the presence of these packing elements provides, among other things, more intimate contact between the solids and gases than if the packing elements were omitted, and prevents surging and pounding of the fluidized bed which is experienced when relatively deep, free beds are employed.

The size and character of the packing, as well as its employment in the fluid zone, may vary appreciably as is well known per se. For example, the packing or dispersing elements may be dumped into the reaction or fluid zone in random fashion, or these elements may be made to assume predetermined geometric patterns. Maximum benefits of the invention, such as the prevention of overall recirculation of the powder in the reactor and particularly the enhancement of countercurrent heat exchange, generally may be attained by having the packing elements arranged at random so as to prevent either vertical or horizontal extended and uninterrupted flow of the gases and powdered solids through the reactor.

It is also known that, other factors being equal, the density of the fluidized mixture in the reactor will vary inversely as the size of the packing elements. For example, the larger size packing elements will produce a lower density of the fluid bed at a given gas rate and for a given subdivided solid material than smaller size packing elements. The dimensions and the style of the packing elements utilized may also be varied appreciably, depending upon the type of reactor employed, the velocities used, the particular reaction being carried out and the character and particle size of the solids being suspended. In general, the packing may vary from a minimum dimension of about ¼ inch to a maximum dimension of 12 inches or more. Packing elements of the saddle type having a maximum dimension of 1 inch to 2 inches, for example Berl saddles, are particularly suitable for most reactors. The spacing or packing elements should be shaped and arranged within the reactor so as to avoid extended horizontal surfaces on which the solid particles undergoing treatment can settle and collect.

Where the space occupied by the packing is not an important factor, the spacing elements may be in the form of solid balls, spheres, cylinders, blocks, bricks and the like. However, where it is important to provide maximum reactor space with minimum volume occupied by the packing or spacing elements, it is preferable to provide packing elements, the material of which, for a given cellular structure will occupy a minimum volume in the treating zone. As is well-known, such elements may, for example, be in the form of hollow cylinders or U-shaped elements resembling saddles, and the like. When using saddle-shaped elements, the elements should be designed to prevent close nesting of one saddle in another.

The spacing or packing elements may be made of any desired material capable of withstanding the conditions of operation. In cases where the reactor is adapted to carry out catalytic reactions, the spacing elements may have a catalytic rather than an inert surface, and where necessary, such catalytic surfaces may be periodically regenerated in a known manner. The elements may be made of heat-conducting material, such as alloy capable of withstanding the reaction conditions, but preferably they are made of ceramic or other heat-insulating material, especially in cases where heat transfer from a particular section of the reaction zone to another is to be minimized. Thus, for instance, it may be unusually advantageous to have a heat-insulating packing in the hot reaction zone in the intermediate portion of the tower, and to have heat-conducting packing in the heat exchange zones located above and below the said reaction zone.

In order successfully to maintain the desired liquid simulating phase of subdivided solids and gases in the interstices between the stationary packing elements, the circulating subdivided solids or powder should be of such density, particle size and particle size distribution as to be free-flowing through the interstices without becoming packed or agglomerated even in the absence of an upflowing gas, as is well known per se.

In general, this characteristic is influenced by the content of fines in the subdivided solids having a diameter less than about 20 microns. Usually the content of such fines should not be greater than about 12% by volume since a percentage greater than this will render subdivided particles having particle size distribution in the preferred range from about 20 microns to 200 or 300 microns non-free flowing. If the subdivided particles are free-flowing, it is possible to fluidize the subdivided particles in the interstices of the packing regardless of the relative sizes of the packing and the subdivided particles providing the packing is sufficiently large to provide interstices each having a diameter of the largest particle of the subdivided solids. In general, the packing should be such as to provide interstices having a length as compared to diameter of not greater than 15 to 1. It is preferred that the ratio of length as compared to diameter be in the range of 1 or 2 to 1. Also the packing should be at least about 10 times as large as the largest particle to be fluidized.

Depending on the particular reaction to which the invention is applied, the fluidized solid may be a substance or mixture of substances of such a composition as to fulfill at least one of the following functions:

a. It may be an inert, such as sand or ground ceramic, coke, powdered metal etc., acting purely as a heat exchange medium.

b. It may be a catalyst promoting the desired reaction, such as a silica or alumina base catalyst or a mixture of appropriate metal oxides.

c. It may constitute one of the reactants, such as coke in the synthesis of hydrocarbons from the former or in the manufacture of water gas; or it may be gypsum in the manufacture of sulfuric acid, or ore in ore reduction;

d. Or it may be a reaction product such as a metal oxide formed by oxidation of liquid or vaporized metal reactant, e. g. zinc. However, where the circulating solid is a reactant, it is of course essential that a sufficient amount of unconverted solid or solid product be allowed to leave the reaction zone so as to effect the required heat exchange in the lower part of the tower.

In practicing the invention as illustrated in the drawing, the hydrocarbon gas feed such as substantially pure ethane, or a mixture of ethane, ethylene, propane and propylene, or any available refinery or natural gas stream containing more than 50 percent by volume of components heavier than methane, is introduced into the reactor through line 5 at the bottom of compartment 2 and is passed upwardly through packed reactor 1 in countercurrent flow to the hot finely divided inert solids which pass downwardly through the interstices between the packing elements. The superficial gas velocity of the feed in compartment 2 is about 0.5 to 4 feet per second so as to maintain the downflowing solids in a dense, liquid simulating state.

An oxygen-containing gas such as air is introduced into the reactor through line 6 at the bottom of compartment 3 at a rate also calculated to give an upward superficial gas velocity of about 0.5 to 4 feet per second so as to maintain the downflowing hot subdivided solids in the interstices of the packing in the form of a dense, liquid simulating stream as in compartment 2 previously described. The amount of air so added is equal to or only slightly larger than about the minimum required to burn sufficient hydrocarbon feed to produce the necessary heat of reaction, and maintain the desired reaction conditions. Thus, depending on the degree of conversion desired per pass, about 0.5 to 1.7 or 2 mols of air, or about 0.05 to 0.4 mol of pure oxygen are required per mol of ethane or equivalent hydrocarbon feeds. Since it may be desirable to maintain approximately the same gas velocity in both compartments 2 and 3, it may be advantageous to place baffle 4 so as to make the ratio of cross-sections of the two compartments about the same as the ratio of the respective gas rates prevailing in the two compartments.

When the hydrocarbon and air streams meet above the top of baffle 4, the required quantity of the hydrocarbon feed is burned so as to raise the temperature of the feed rapidly to about 1500 to 2000° F., or preferably 1700 to 1800° F., and to produce the heat required to maintain the desired cracking reaction. However, in order to avoid overcracking of the feed, after about 0.2 to 1 or 2 seconds at reaction temperature, the gases rising from the reaction zone are progressively quenched to a temperature below 1500° F., or even as low as 200° F. or lower, by evenly distributing relatively cool subdivided solids through one or more lines 7 on top of the packing in the reactor 1 and passing the solids in countercurrent with the rising gases. Where necessary, additional heat may also be withdrawn from the system by means of a heat exchanger 8, which may be embedded near the top of the packing or located in the fluid solids lift-line or exit gas line 19, and through which a convenient cooling fluid is circulated. In this manner only about the middle one-third or one-half of the reactor tower is maintained at the very high cracking temperature whereas the bottom part serves to preheat the incoming gaseous reactant and to cool the countercurrent circulating solids by direct heat exchange, while the upper part serves to quench the cracked products by direct heat exchange with recirculated fluidized solids previously cooled in the said bottom part.

The cooled powdered solids, withdrawn at about 200–1000° F. from the bottom of the reactor 1 through lines 9 and 10 and a line or standpipe 11 may be lifted through transfer line 12 to the top of the reactor by means of any convenient lift gas. For instance, such lift gas may be introduced into the transfer line 12 through gas line 13 and after mixing with the solids from standpipe 11, the resulting suspension is passed upwardly at a superficial gas velocity of about 5 to 10 or 20 feet per second through line 12 to a cyclone 14 or similar dust separating device located above the packed tower bed. In the cyclone the powder is separated from the gas and returned to the reactor through previously mentioned lines or standpipes 7.

In the described ethylene process it is preferred to use either compressed cold air or cold hydrocarbon reactant as the lift gas since in this manner it is possible to extract additional heat from the circulating solids and to use the extracted heat for preheating one of the streams passing through the reactor. For instance, when relatively cold compressed hydrocarbon reactant is introduced through line 13 as the lift gas, it may become preheated by heat exchange with warm solids in transfer line 12 and after separation in cyclone 14 may be returned through cyclone outlet 15 and line 16 to the bottom of the reactor where it is fed into reactor compartment 2 through aforementioned line 5. Depending on the original gas pressure in line 13 and on the subsequent pressure drop, a blower may or may not be necessary in return gas line 16 in order to feed the gas into reactor 1 at the desired pressure.

Alternatively, it is equally possible to introduce cold air as the lift gas through line 13, in which event preheated air is separated in cyclone 14 and may be passed through lines 17 and 6 for use in compartment 3 of the reactor. The latter alternative may be particularly advantageous when the circulating solids consist of a material requiring regeneration or removal of carbonaceous deposits since it may then be possible to withdraw the catalyst from the bottom of reactor 1 above the regeneration temperature or combustion temperature of the carbonaceous deposit and to use transfer line 12 as a regeneration zone, some regeneration also taking place in oxygen-containing compartment 3. In such an instance, of course, the solid separated in cyclone 14 must be thoroughly cooled to the desired quenching temperature primarily by means of one or more heat exchangers 8 or by equivalent means. As a third alternative, it is possible to use the cracked products from low-pressure line 19 as the lift gas. This may be particularly advantageous since it allows the elimination of cyclone 18 and also allows the location of the reactor tower at a lower elevation above ground than when a high-pressure feed gas is used for lifting, in which case a standpipe may be required for the purpose of introducing the circulating solids from bottom of the reactor into the lift gas in line 13.

As still another alternative, the lift gas may be an extraneous inert gas such as steam or flue gas introduced under suitable pressure into line 13 and rejected or recycled to the lift circuit after passage through line 12 and cyclone 14.

The cooled cracked products, which may contain about 10 to 20 mol percent of ethylene in admixture with about 3 to 30 mol percent of unconverted hydrocarbon feed as well as substantial amounts of hydrogen and nitrogen and minor amounts of water vapor, oxides of carbon, acids, aldehydes, etc., are withdrawn from the top of reactor 1, and preferably passed through a cyclone 18 where entrained solids are removed. The substantially dust-free gas is passed through line 19 to a recovery system (not shown) where it is purified. Desired fractions such as ethylene, may be concentrated and recovered by low temperature fractional distillation, solvent extraction, selective adsorption, and/or other means as is well known per se.

In addition to the process just described, the invention is similarly applicable to various other exothermic as well as endothermic reactions. For instance, ethane or other hydrocarbons may be cracked autothermically to acetylene in a two-stage reaction using a suitable catalyst such as aluminum oxide. In such a reaction the first stage produces ethylene at about 1500 to 2000° F. in about 0.5 second substantially as described earlier herein, and the second stage, superimposed above the first stage, produces acetylene by operating at higher temperature such as 2500° F. or higher. This additional increase can be obtained by injecting additional preheated air or oxygen to the ethylene-containing first-stage products via a packed compartment kept separate from the rest of the packed bed with the aid of an additional baffle extending a suitable height above the bed level corresponding to the first-stage reaction zone. The second stage is conveniently carried out at temperatures above 2500° F.

The invention may also be applied to still other high temperature reactions carried out at temperatures above 800° F. wherein heat exchange between reactants and products is desirable. This may include endothermic reactions with or without diluent such as coal gasification mentioned earlier herein, thermal or catalytic cracking, butadiene production, dehydrogenation or hydroforming in which the heat of reaction can be supplied by heating the circulating stream of catalyst or other solid or a portion thereof. For instance, cold catalyst withdrawn from either the top or the bottom end of the reactor may be passed to a regeneration zone where it is heated by combustion of carbonaceous contaminants and the hot, regenerated catalyst may be reinjected into the reactor at the level of the high temperature reaction zone. In this manner, the heat of regeneration can be utilized more extensively in the process than is possible in conventional fluid hydroforming wherein hot spent catalyst is withdrawn from the conversion zone and excess heat must usually be withdrawn from the hot regenerated catalyst by heat exchangers or waste heat boilers before returning the hot regenerated catalyst to the conversion zone.

It will be observed that the present invention is of particular value when at least two streams of cold gaseous reactants are fed separately at the bottom of the packed column and are allowed to react only at an intermediate level, therein, while cold powdered solids enter at the top of the column and pass therethrough in countercurrent relation to the gases. The rising cold gas streams are thus heated up by direct heat exchange with the countercurrent solids descending from the hot reaction zone located at an intermediate level in the column, the preheated gases are mixed and react exothermically in the reaction zone, and the product gases rising from the reaction zone are cooled off again by countercurrent contact with the cold solids entering at the top. Among the main advantages of the invention is that only cool streams enter and leave the main reactor wherein the hot reaction zone is contained and wherein unusually efficient heat utilization is obtained. This advantage can be realized by keeping the reactant gas streams separate until they reach the central part of the column where a relatively sudden rise in temperature may be obtained by allowing the gases to mix and to liberate heat necessary for or incidental to the progress of the main reaction. In this manner a careful control over the reaction, as well as efficient heat exchange between reactants and products can be maintained without the use of expensive and relatively inefficient heat exchangers since the flow arrangement of the several gaseous and solid streams automatically keeps the high temperature reaction zone strictly localized near the middle of the height of the tower while transferring heat from the streams leaving the reaction zone to those approaching the latter. In other words, effective quenching of the gaseous reaction products is obtained by direct countercurrent heat exchange with the cold powdered solids recirculated to the top of the tower. At the same time efficient preheating of the incoming reactant gases is obtained directly in the main reactor by direct countercurrent heat exchange with the powdered solids descending from the hot reaction zone, and the solids themselves are thus cooled for recirculation before they are withdrawn at the bottom of the reactor. Also, since in conventional equipment the quenching operation is usually carried out by the injection of a cold liquid or vapor, the use of circulating solid for this purpose contributes materially to the heat economy of the present invention.

Moreover, since it is desirable for the aforementioned reasons to keep the different reactant gases separate until they reach the reaction zone, by designing the cross-sections of the several compartments to correspond approximately with the respective volumes of the gases passing therethrough, an exceptionally smooth flow of the descending powdered solids can be obtained throughout the entire height of the tower. In contrast, if only one of the gas streams is introduced into the bottom of an undivided tower, and the other gas stream is injected directly into the reaction zone in the central portion of the tower, uneven mixing, loss in heat economy and, especially, a sudden rise in the total upward gas velocity may be caused at that point with attendant channelling as well as other disruption of both gaseous and solid flow through the tower.

Particularly uniform flow characteristics may be obtained throughout the column by using packing of different size characteristics in the different compartments and in the undivided upper part of the column, since by proper choice of packing elements, the free cross-section in each part of the tower may be proportioned to the gas volume flowing through that particular part of the column. For instance, if the chemical reaction taking place between the two gas streams near the middle of the column results in a net increase in gas volume, it may be desirable to use coarser packing in the upper, undivided portion of the column than in the compartments below, since the proportion of free voids increases with the coarseness of the packing. Thus, by proper choice of packing the upward gas velocity may be maintained substantially constant throughout the column, although the volume of gas per gross cross-section of the column may be different in different parts thereof. Also, by proper selection of compartment cross-section, packing, gas rates and fluidized solids rate in the various compartments, it will be possible to preheat the separate gases to different temperatures before mixing, if so desired.

The major advantages of the present invention can thus be summarized as follows:

a. High thermal efficiency is obtained without the need for expensive indirect heat exchanger equipment, and any need for inefficient injection of a liquid quench medium is obviated. It is possible to feed cool reactants and/or diluents into the reactor and withdraw essentially cool products, thereby greatly simplifying equipment construction, operation and maintenance. In particular, since the high temperature required for the reaction is confined to one section of the reactor tower alone, that section can be readily insulated to avoid use of expensive alloy construction.

b. The several gases partaking in the reaction can be preheated in the system separately from each other until they have reached the necessary temperatures, thus localizing the main reaction in a given section of the reaction vessel and avoiding the occurrence of undesirable sidereactions. By adjustment of flow rates, the several gaseous reactants can be preheated in the system to different temperatures before entering the main reaction zone and this may be of particular advantage where one of the gas streams is a heat sensitive hydrocarbon and the other stream is an inert diluent or an insensitive or refractory gas, e. g. steam in butylene cracking, or air in autothermic cracking, or tail gas in hydroforming. In such a case it may be desirable to preheat the heat sensitive gas to a much lower temperature than the other gas before the two are mixed in the reaction zone.

c. Catalyst regeneration or combustion of carbonaceous deposits can be carried out by continuously withdrawing a portion of the circulating solid and subjecting it to regenerating conditions in a separate vessel as suggested earlier herein. Also, when an oxygen-containing gas is passed separately through one of the reactor compartments, catalyst regeneration may take place at least in part directly in such a reactor compartment.

d. Finally, due to the countercurrent heat exchange taking place directly in the reactor vessel, air can be used to obtain reaction zone temperatures previously unattainable in conventional equipment without the use of oxygen gas, and in this manner significant economies may be made in autothermic acetylene production and the like.

In addition to the specific examples, arrangements and conditions heretofore described, it will be realized that these can be varied and modified without departing from the scope of the present invention. For instance, instead of utilizing a packed tower, it is possible to adapt a bubble plate or a sieve plate column to the purposes hereof by dividing the lower part of such a column into two independently operating compartments. Also, instead of dividing the bottom part of a tower into two more or less semi-cylindrical compartments by means of a single flat baffle as heretofore described, it is possible to use a plurality of such baffles, which if desired, may have different heights so as to permit the carrying out of multistep reactions within a single tower. Furthermore, instead of using flat baffles, it is equally possible to divide a packed or plate tower by means of one or more cylindrical baffles into an inner cylindrical packed compartment surrounded by annular packed compartments, which may be used alternately for the several gases partaking in the reaction. Also, several vertical cylindrical packed compartments of equal or different cross-section as well as height can be arranged within the main shell by inserting suitable pipes therein. This would permit easy variation of the ratio of the various reacting gases into the column without disturbing the desired flow rates except in a few of the smaller cylinders. By proper distribution of these cylinders, efficient mixing can be obtained at the lower boundary of the reaction zone. Also, in endothermic and even in certain exothermic processes it may be practicable to avoid the use of baffles in the reactor and to keep the hot reaction zone from extending too far down in the reactor by employing suitably high flow rates for the feed gases in the lower part of the tower.

While the illustrative examples have been described in connection with essentially non-catalytic processes requiring two gaseous reactants, it should be understood that the invention is equally applicable to processes wherein either the stationary tower packing or the circulating solid material or both may have catalytic properties. Also, some benefits of the present invention may be obtained by using a tower containing a moving granular bed instead of circulating powdered solids through a packed bed.

Having given a full and exact description of the invention and of the manner and process of constructing and using it, the claimed improvement is particularly pointed out in the appended claims.

I claim:

1. A process for conducting exothermic reactions at temperatures above 800° F. which comprises in combination introducing separate relatively cool gas streams into separate adjacent preheating zones in the lower part of a packed column, the introduced gases being capable of reacting exothermally with one another with a net increase in gas volume introducing finely divided cold powdered solids having a particle size in the range of about 20 to 300 microns at the top of the packed column and passing them as a dense bed downwardly therethrough in countercurrent contact with gas, passing the introduced gas streams upwardly through the separate adjacent zones at a velocity sufficient to maintain the downflowing solids as a dense, liquid simulating phase in the interstices of the column, combining the gas streams at an intermediate level in the column in a reaction zone extending across substantially the entire cross-section of the column, passing the resulting combined gas stream upwardly to the top of the column at a velocity sufficient to maintain the downflowing solids as a dense, liquid-simulating phase; said packed column being provided with coarser packing in said reaction zone than in the preheating zones located therebelow, the relative coarseness of the packing being such that a substantially constant gas velocity is maintained throughout the column despite the increase in gas volume in the upper part thereof withdrawing the finely divided solids from the bottom of the packed column, and removing the combined gas stream from the top of the column.

2. A process according to claim 1 wherein the solids withdrawn from the bottom of said packed column are suspended in a lift gas, the resulting suspension is passed above the top of said column, and the solids are mechanically separated from the lift gas for recirculation to the top of the packed column.

3. A process according to claim 2 wherein the lift gas separated at the top of the column from the suspended solids is subsequently introduced into one of the compartments at the bottom of the column.

4. A process according to claim 2 wherein the product gas removed from the top of the packed column is used as the lift gas.

5. An autothermic process for cracking saturated hydrocarbons to ethylene which comprises separately introducing a relatively cool ethane-containing hydrocarbon gas stream and a relatively cool oxygen-containing gas stream into separate adjacent packed preheating zones in the lower part of a packed column, the amount of oxygen-containing gas introduced being sufficient to oxidize enough of the hydrocarbon gas to supply the required heat of cracking, introducing finely divided relatively cold powdered solids having a particle size in the range of about 20 to 300 microns at the top of the packed column and passing them downwardly therethrough in countercurrent contact with rising gases, passing the introduced gas streams upwardly through the interstices of the respective packed zones at a velocity sufficient to maintain the downflowing solids as a dense, liquid-simulating phase therein, combining the gas streams at an intermediate level in the column, thereby raising the combined gas to a temperature of at least 1500° F. by the heat of combustion resulting from the combination of the hydrocarbon and oxygen-containing streams and thereby converting the gas to ethylene, passing the hot product gas upwardly to the top of the column in countercurrent contact with the relatively cold powdered solids and at a velocity sufficient to maintain the downflowing solids as a dense, liquid-simulating phase; withdrawing the finely divided solids from the bottom of each of the packed zones at the bottom of the column, said packed column being provided with coarser packing in the intermediate, reactive portion of the column than in the preheating zones located therebelow, the relative coarseness of the packing being such that substantially the same gas velocity is maintained in said reactive portion as in the preheating zones despite the intervening increase in gas volume; and removing relatively cold product gas from the top of the column.

6. A process according to claim 5 wherein the solids withdrawn from the bottom of said packed zones are suspended in a relatively cold lift gas, the resulting suspension is passed above the top of said packed column, and the solids are mechanically separated from the lift gas for recirculation to the top of said packed column.

References Cited in the file of this patent

UNITED STATES PATENTS

| | | |
|---|---|---|
| 1,995,136 | Winkler et al. | Mar. 19, 1935 |
| 2,331,433 | Simpson et al. | Oct. 12, 1943 |
| 2,394,814 | Snuggs | Feb. 12, 1946 |
| 2,444,990 | Hemminger | July 13, 1948 |
| 2,468,508 | Munday | Apr. 26, 1949 |
| 2,477,502 | Utterback et al. | July 26, 1949 |
| 2,533,026 | Matheson | Dec. 5, 1950 |
| 2,543,742 | Evans | Feb. 27, 1951 |
| 2,631,921 | Odell | Mar. 17, 1953 |
| 2,642,346 | Keith | June 16, 1953 |